M. R. SINGERMAN.
SHOCK ABSORBER.
APPLICATION FILED SEPT. 28, 1917.

1,279,463.

Patented Sept. 17, 1918.

INVENTOR
Morris Richard Singerman
BY Wiedersheim & Fairbanks
ATTORNEYS

UNITED STATES PATENT OFFICE.

MORRIS RICHARD SINGERMAN, OF NEW YORK, N. Y.

SHOCK-ABSORBER.

1,279,463.  Specification of Letters Patent.  Patented Sept. 17, 1918.

Application filed September 28, 1917. Serial No. 193,620.

*To all whom it may concern:*

Be it known that I, MORRIS RICHARD SINGERMAN, a citizen of the United States, residing in the city, county, and State of New York, have invented a new and useful Shock-Absorber, of which the following is a specification.

My invention consists of the provision in an automobile or other vehicle of means for supporting the running boards thereof, and the mud guards when connected with the latter, whereby the boards are resiliently supported, so that shocks imparted to the same are absorbed, and the boards are prevented from sagging and rattling.

The invention is satisfactorily illustrated in the accompanying drawing, but the important instrumentalities thereof may be varied, and so it is to be understood that the invention is not limited to the specific details shown and described, as long as they are within the spirit or scope of the claims.

Similar numerals of reference indicate corresponding parts in the figures.

Figure 1:
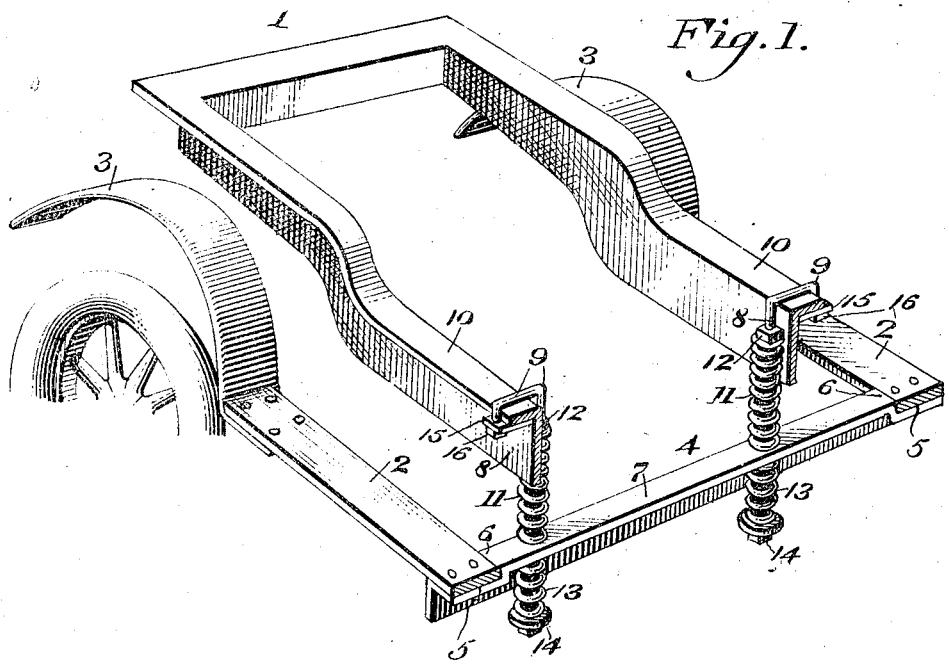
Figure 1 represents a perspective view partly in vertical section of a shock absorber for the running boards and mud guards of an automobile or other vehicle employing the same.
Figure 2:
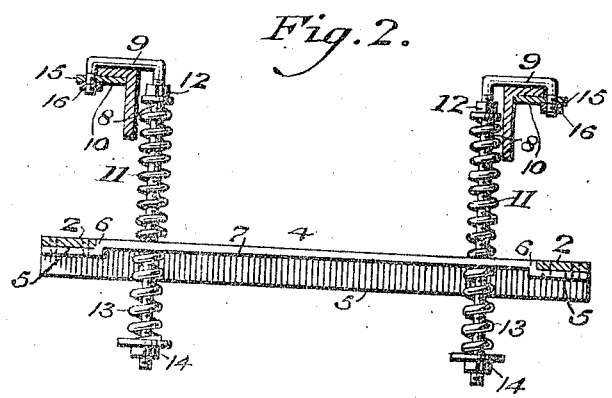
Fig. 2 represents a partial end elevation and transverse section thereof.

Referring to the drawings.

1 designates a portion of the frame of the running gear of the chassis of an automobile or other vehicle, which latter is provided with the running boards 2, and the mud guards 3, usual in such cases.

4 designates a cross bar which is formed of what is known as an angle iron, its terminals having the adjacent portions of the running boards seated thereon and riveted or otherwise firmly connected therewith, said terminals having thereon depressions 5, whereby the top of the cross bar is flush with the tops of the running boards, said depressions also forming the shoulders 6 against which the inner sides of the running boards may abut, thus assisting in properly locating said boards on said cross bar and bracing the former in position on the latter, the angle iron cross bar also being strong and durable in its nature, and firmly sustaining the running boards and consequently the mud guards thereon.

In the horizontal limb 7 of the bar 4 are openings through which are passed freely the vertically-extending rods 8 whose upper ends are provided with hooks or elbows 9 whose side limbs are adapted to be fitted on the side members 10 of the frame 1, thus suspending said rods from said members.

Encircling the rods 8 above the cross bar 4 are the coil springs 11, which are rested upon the limb 7 of the cross bar and bear upwardly against the nuts 12 which are fitted on adjacent threaded portions of said rods, thus serving to retain said springs in position and to adjust the tension thereof.

Encircling the rods 8 below said cross bar are the coil springs 13 which bear upwardly against the limb 7 of the cross bar and are rested upon the nuts 14 which are fitted on adjacent threaded portions of said rods, thus serving to retain said springs in position and to adjust the tension thereof. It will be seen also that each upper and lower spring has its own means for adjusting the tension of said springs independently of each other, and the rods guide the springs in their motions.

Washers are interposed between the springs and nuts respectively for evident purposes. It will be seen that as the running boards are imposed on the cross bar and the latter is connected with the frame 1 by the rods 8, the springs form resilient cushions for said cross bar, whereby the running boards and the mud guards also will ride resiliently on said cross bar, and so shocks that may be imparted to the running boards and also the mud guards rising and falling with the cross bar are absorbed, thus preventing rattling of said members and sagging thereof especially the running boards.

When the motion of the running boards is downwardly the springs 13 form the resilient cushions for said boards. When the motion of the running boards is upwardly, the springs 11 form the resilient cushion for said boards, and thus the motions of the boards producing shocks in either directions are absorbed.

It is evident that should shocks be imparted to the chassis which is supported on the frame 1, the same will not be imparted to the running boards and mud guards owing to the resilient cushions formed by the springs interposed between said frame and the cross bar 4.

In order to prevent the hooks or elbows 9 from being jolted from the frame 1, I employ the washer plates 15 which are rested against the underside of the horizontal limbs of the side members 10 of said frame and provided with openings through which the vertical limbs of the hooks or elbows 9 are passed downwardly. The lower ends of said vertical limbs of said hooks or elbows are formed with threads on which are fitted the nuts 16 which when tightened hold said washer plates firmly in position and prevent the disconnection of the hooks or elbows from said plates, and consequently from the frame 1.

Having thus described my invention what I claim as new and desire to secure by Letters Patent, is:—

1. In a vehicle having a running board, a bar member on which said board is mounted, a resilient support for said member and a resilient connection for said bar member with the running gear of said vehicle, said bar member having therein a depression in which the adjacent portion of the running board is seated, said depression forming a shoulder against which said portion of the running board abuts.

2. In a vehicle having a running board, a bar on which said board is mounted, a resilient support for said bar, a resilient device above said board, a rod-like member fitted freely in said bar adapted to retain and guide said device and support, and means on said rod-like member for connection of the same with a member of the running gear of the vehicle, said rod-like member having thereon means for the individual adjustment of the tension of said resilient device and support respectively, said rod-like member being common to the upper and lower resilient device and support.

3. In a vehicle having a running board, a bar on which said board is mounted, a resilient support for said bar, a resilient device above said board, a rod-like member fitted freely in said bar adapted to retain and guide said device and support, and an elbow-like member on the upper portion of said rod-like member attachable to the frame-member of the running gear of the vehicle, said rod-like member being common to said resilient support and device.

4. In a vehicle having a running board, a bar on which said board is mounted, a resilient support for said bar, a resilient device above said board, a rod-like member fitted freely on said bar adapted to retain and guide said resilient device and resilient support common to both, means on said rod-like member adapted for the adjustment of the tension of said support and device independently of each other, and means on said rod-like member attachable to the frame of the running gear of the vehicle.

MORRIS RICHARD SINGERMAN.

Witnesses:
 ARTHUR C. VAUGHAN,
 THOMAS J. CAHILL.